(12) United States Patent
Jung

(10) Patent No.: US 9,556,895 B2
(45) Date of Patent: Jan. 31, 2017

(54) INSERT BOLT HAVING ANTI-TURN FUNCTION

(71) Applicant: Kab Hee Jung, Siheung-si (KR)

(72) Inventor: Kab Hee Jung, Siheung-si (KR)

( * ) Notice: Subject to any disclaimer, the term of this patent is extended or adjusted under 35 U.S.C. 154(b) by 0 days.

(21) Appl. No.: 14/767,901

(22) PCT Filed: Feb. 14, 2014

(86) PCT No.: PCT/KR2014/001235
§ 371 (c)(1),
(2) Date: Aug. 13, 2015

(87) PCT Pub. No.: WO2014/126420
PCT Pub. Date: Aug. 21, 2014

(65) Prior Publication Data
US 2016/0032957 A1 Feb. 4, 2016

(30) Foreign Application Priority Data
Feb. 15, 2013 (KR) ........................ 10-2013-0016400

(51) Int. Cl.
*F16B 21/00* (2006.01)
*F16B 37/04* (2006.01)
(Continued)

(52) U.S. Cl.
CPC ............. *F16B 37/04* (2013.01); *F16B 33/002* (2013.01); *E04B 1/4157* (2013.01)

(58) Field of Classification Search
CPC ........ F16B 37/04; F16B 33/002; E04B 1/4157
(Continued)

(56) References Cited

U.S. PATENT DOCUMENTS 1,857,388 A * 5/1932 Linderman ........... F16B 33/002
411/378
1,946,800 A * 2/1934 Maclean ............... F16B 33/004
411/399
(Continued)

FOREIGN PATENT DOCUMENTS

JP 07-038736 U 7/1995
KR 20-0152833 Y1 7/1999
(Continued)

*Primary Examiner* — Gary Estremsky
(74) *Attorney, Agent, or Firm* — East West Law Group; Heedong Chae

(57) ABSTRACT

The present invention relates to an insert bolt, and more particularly, to an insert bolt having an anti-turn function, in which one-way teeth are formed on a bottom surface of a bolt head constituting the insert bolt, such that a bolt shaft can turn only in a clockwise direction when casting concrete, thereby preventing the bolt shaft from loosening from a connecting rod. The insert bolt of the present includes: a bolt shaft, a spring coupled to an outer side of the bolt shaft to perform an elastic function, a sliding movement member coupled to the outer side of the bolt shaft and coupled to a lower part of the spring to perform a sliding movement, a supporting rib member positioned in a lower part of the sliding movement member and supporting the sliding movement member and a connecting rod connected to a lower part of the bolt shaft, wherein the bolt shaft includes a disc-shaped head part, and a central shaft in a form of a circular cylinder integrally formed in a center part of the disc-shaped head part, wherein the disc-shaped head part has one-way, a lower part of the central shaft has a screw thread, and the one-way teeth includes an inclined surface and a vertical surface, such that, when an external pressure is applied due to concrete casting, the concrete casting pressure is dispersed through the inclined surface and the concrete casting pressure is aggregated through the vertical surface such that (Continued)

a rotating force is created only in a direction in which the bolt shaft tightens onto the connecting rod.

1 Claim, 11 Drawing Sheets

(51) Int. Cl.
  *F16B 33/00* (2006.01)
  *E04B 1/41* (2006.01)
(58) Field of Classification Search
  USPC .................................. 411/340; 52/698, 699
  See application file for complete search history.

(56) References Cited

U.S. PATENT DOCUMENTS

| | | | | |
|---|---|---|---|---|
| 3,769,774 | A * | 11/1973 | Barnes | E04B 1/4157 248/58 |
| 3,782,437 | A * | 1/1974 | Seckerson | B60Q 1/0683 411/107 |
| 3,843,080 | A * | 10/1974 | Imai | E04B 9/18 248/343 |
| 3,896,599 | A * | 7/1975 | Werstein | E04B 1/4157 411/508 |
| 5,944,466 | A * | 8/1999 | Rudnicki | F16B 13/04 411/340 |
| 6,240,697 | B1 * | 6/2001 | Thompson | E04B 1/4121 52/698 |
| 6,868,647 | B2 * | 3/2005 | Poldmaa | A62B 35/0068 182/45 |
| 7,001,126 | B2 * | 2/2006 | Lesecq | F16B 19/1054 411/340 |
| 7,093,400 | B1 * | 8/2006 | Thompson | E04B 9/18 52/698 |
| 2003/0145437 | A1 * | 8/2003 | Medgyes | F16B 5/0692 24/290 |
| 2007/0095004 | A1 * | 5/2007 | Heath | E04B 1/4157 52/741.1 |
| 2012/0266560 | A1 | 10/2012 | Panasik et al. | |

FOREIGN PATENT DOCUMENTS

| | | |
|---|---|---|
| KR | 20-2000-0017263 U | 9/2000 |
| KR | 20-0379873 Y1 | 3/2005 |

\* cited by examiner

Prior art

Prior art

Prior art

INSERT BOLT HAVING ANTI-TURN FUNCTION

TECHNICAL FIELD

The present invention relates to an insert bolt, and more particularly, to an insert bolt having an anti-turn function, in which one-way teeth are formed on a bottom surface of a bolt head constituting the insert bolt, such that a bolt shaft can turn only in a clockwise direction when casting concrete, thereby preventing the bolt shaft from loosening from a connecting rod.

BACKGROUND ART

An access ceiling, in which a vacant space is formed for allowing access from a top and pipes, wires, cables, ducts, etc. are installed in the vacant space, and then the vacant space is finished by a finishing material such as a panel and the like, is provided at a ceiling of a building. To install the access ceiling, an anchor bolt is used to install various frames such as shaped steels, beams, carrying channels, brackets, pipes, wires, cables, etc. on concrete structures.

A portion of the anchor bolt is buried in the concrete structure, a screw part of the anchor bolt protruding from the concrete structure is fastened to a screw hole, which is drilled beforehand through the frame, or the screw part of the anchor bolt passes through the frame so that the screw part is fastened to the frame. To strengthen the anchorage of the anchor bolt when installing the anchor bolt, and to prevent the anchor bolt from moving to an incorrect position or to an inclined state, fixing apparatus of various structures are being used.

The anchor bolt (insert bolt, hereinafter called insert bolt) will be described with reference to the exploded perspective view of the insert bolt of a related art shown in FIG. 1 and a sectional view showing an example of an installed state of the insert bolt of the related art shown in FIG. 2.

As shown, the insert bolt of the related art includes a bolt shaft 10 provided at an end part thereof with a screw part 12, a spring 40 and a washer W sequentially fitted around the bolt shaft 10, a supporting rod 20 having a supporting rib member 22 having elasticity, and a connecting rod 30, which is inserted last and screwed with the screw part 12.

When a bolt head 14 is pressed and inserted into a hole drilled in a steel structure such as a steel beam and the like while all components are completely assembled, as shown in FIG. 6, the supporting rib member 22 is contracted while the spring 40 is compressed to push the washer 24 upward and the washer is continuously moved upward such that the supporting rib member 22 completely passes through the hole, thereby fastening the insert bolt.

When the supporting rib member 22 completely passes through the hole, as described above, the supporting rib member 22 supports a bottom surface of the hole and the washer W is pushed by the spring 40 to support a top surface of the hole such that the supporting rib member 22 is fixed.

Then, the concrete is casted, and after a predetermined time has elapsed, a component having a screw thread, which can fix other structures from a lower side of the connecting rod 30, is screwed to the connecting rod.

However, the insert bolt of the related art includes the washer W and the supporting shaft 20 which are separate components, so when casting she concrete or external force is applied, the spring 40 is compressed and the washer is fluctuated, thus the bolt shaft 10 is not securely fixed in the hole, but transversely moved.

Specifically, when casting the concrete, if the body of the insert bolt is moved and become inclined, a worker needs to fasten the insert bolt while checking the insert bolt using the eye. If this process is performed carelessly, the inclined construction may be realized, so various problems such as levelling errors wish other structures may occur.

To solve the above described problems, the applicant proposed Korean Registered Utility Model No. 20-0378873 which discloses an insert bolt configured for an accurate installation by clamping a transverse movement even when an external force is applied thereto after the insert bolt is fastened to a hole. The insert bolt, which is installed into a steel structure, includes a bolt shaft 10 having a screw part 12, a spring 40 fitted onto the bolt shaft 10, a washer W, on which a supporting rod 20 is integrated, sequentially fitted onto the bolt shaft 10 after the spring 40, a rib ring R sequentially fitted onto the bolt shaft 10 after the washer W and having supporting rib member 22 corresponding to the washer W, and a connecting rod 30 coupled to the screw part 12, wherein the spring 40, the washer W and the rib ring R are sequentially fitted onto the screw part 10, and then, the connecting rod 30 is fastened to the screw part 12, thereby coupling the insert bolt to the hole.

In the configuration described above, a force may be applied to the bolt shaft and the bolt shaft may be rotated in the process of casting the concrete, thus the bolt shaft and the connecting rod may become released.

In other words, the concrete is casted while the bolt shaft and the connecting rod is screwed, so the pressing force of the concrete is transferred to a bottom surface of the bolt shaft and the bolt shaft vibrates in a counter clockwise direction, thereby releasing the bolt shaft from the connecting rod.

In addition, because there is no structure for adequately dispersing the pressure of the concrete, the proposed structure fails to completely solve the inclination of the bolt head.

In addition, when examining the related art, because the rib ring is slidably coupled to an outer side of the bolt shaft, the rib ring R follows the bolt shaft 10 and is pushed up when the supporting rib member 22 makes contact with an entrance of the hole while the insert bolt is continuously inserted into the hole of the structure such as a steel beam. For this reason, in order to completely couple the insert bolt, the bolt shaft is required to be deeply inserted into the bolt shaft.

In other words, since the rib ring of the related art is slidably coupled, when the insert bolt is inserted into the hole and moved, the rib ring is moved upward by a predetermined height, then the supporting rib member is contracted, so the insertion depth of the insert bolt becomes deeper.

DISCLOSURE

Technical Problem

The present invention is provided to to solve the above mentioned problems, and an object of the present invention is to block a bolt shaft from becoming loosened from a connecting rod through dispersing force concentrated in an inclined surface by forming a one-way teeth on a bolt shaft and allowing force concentrated on a vertical surface to apply rotational force in a tightening direction of the bolt shaft, such that the bolt shaft is prevented from rotating when casting concrete.

In addition, another object of the present invention is to easily couple the insert bolt to a hole of a structure such as a steel beam even when the insert bolt is not deeply inserted, by forming a latching protrusion on a cylindrical fixing part of a supporting rib member corresponding to a rib ring of a related art to fix the supporting rib member between the bolt shaft and the connecting rod.

Technical Solution

To achieve the above described object, an insert bolt of the present invention includes: a bolt shaft (100); a spring (200) coupled to an outer side of the bolt shaft to perform an elastic function; a sliding movement member (300) coupled to the outer side of the bolt shaft and coupled to a lower part of the spring to perform a sliding movement; a supporting rib member (400) positioned in a lower part of the sliding movement member and supporting the sliding movement member; and a connecting rod (500) corrected to a lower part of the bolt shaft, wherein the bolt shaft (100) includes: a disc-shaped head part (110); and a central shaft (120) in a form of a circular cylinder integrally formed in a center part of she disc-shaped head part (110), wherein the disc-shaped head part has one-way teeth (111), a lower part of the central shaft (120) has a screw thread (121), and the one-way teeth (111) includes an inclined surface (111*a*) and a vertical surface (111*b*), such that, when an external pressure is applied due to concrete casting, the concrete casting pressure is dispersed through the inclined surface (111*a*) and the concrete casting pressure is aggregated through the vertical surface (111*b*) such that a rotating force is created only in a direction in which the bolt shaft tightens onto the connecting rod; the connecting rod (500) includes a screw thread forming section (510) and a screw non-forming section (510*a*) at an inner part thereof; the bolt shaft (100) further includes a concavo-convex (112) on an upper part of the disc-shaped head part (110) to increase a coupling force of concrete, and the connecting rod (500) further includes a concavo-convex (500*a*) at an outer side of the connecting rod (500) to increase the coupling force of the concrete; and the supporting rib member (400) includes a cylindrical fixing part (410) and a inclined panel (420) slantly installed at an outer side of the cylinder fixing part, and wherein the cylindrical fixing part (410) includes a latching protrusion (411) fixed between the inclined protrusion (120*a*) of the bolt shaft (100) and the connecting rod (200) to block a movement of the cylindrical fixing part along an outer side of the bolt shaft, and the inclined panel (420) includes a reinforcement member (420*a*) provided between the cylindrical fixing member (410) and the inclined panel to prevent the inclined panel from bending.

Advantageous Effects

As described above, according to the present invention, through dispersing force concentrated in an inclined surface by forming a one-way teeth on a bolt shaft and allowing force concentrating on a vertical surface to apply rotational force in a direction, in which the bolt shaft is tightened, the bolt shaft is prevented from rotating when casting concrete, thereby blocking the bolt shaft from becoming loosened from a connecting rod.

In addition, according to the present invention, a latching protrusion is formed on a cylindrical fixing part of a supporting rib member corresponding to a rib ring of a related art, and the supporting rib member is fixed between the bolt shaft and the connecting rod, such that the insert bolt is easily coupled to a hole of a structure such as a steel beam even when the insert bolt is not deeply inserted.

BEST MODE

Mode for Invention

Hereinafter, an exemplary embodiment of the present invention is described in detail with reference to the accompanying drawings. In addition, when assigning reference numbers to each element of the drawings, similar or identical elements will be assigned same reference numbers, if possible, even when the elements are displayed in a different drawing. When describing embodiment of the present invention, detailed descriptions of well-known functions and structures incorporated herein may be omitted when they make the subject matter of the present invention unclear.

In addition, all terms mentioned throughout this disclosure are the defined based on the functions of what they represent in the present invention, and thus, their definitions may vary depending on user's and operator's intent or customs. Therefore, those terms should be defined based on the content of the present invention presented herein the present disclosure.

Figure 1:
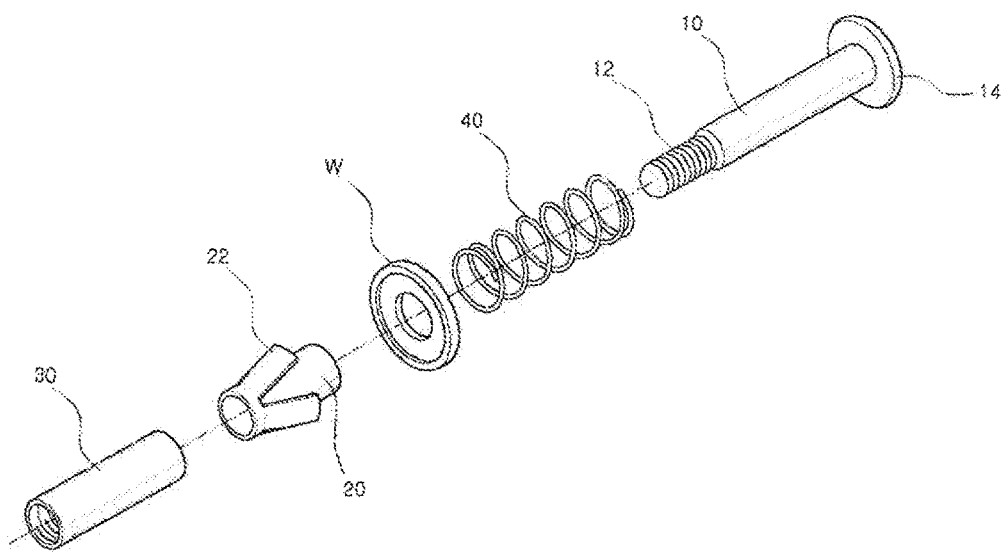
FIGS. 1 to 3 are views showing a configuration of an insert bolt of a related art.
Figure 2:
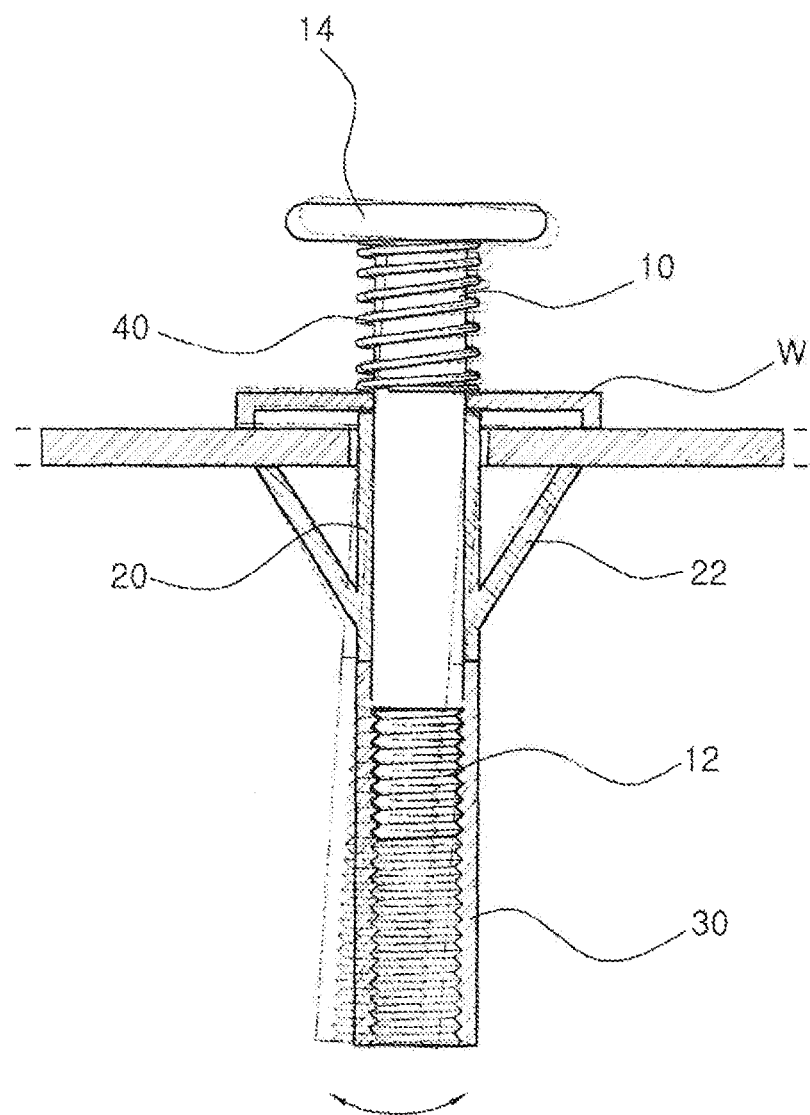
Figure 3:
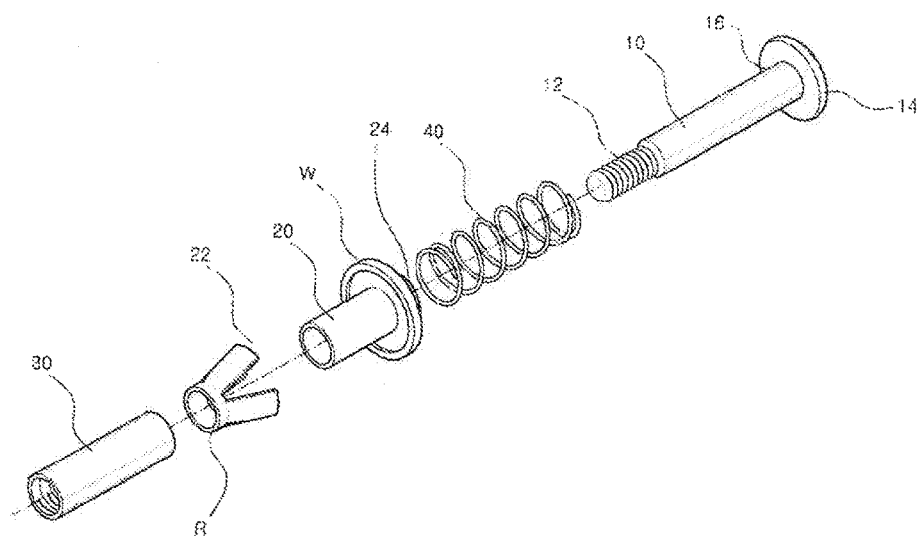
Figure 4:
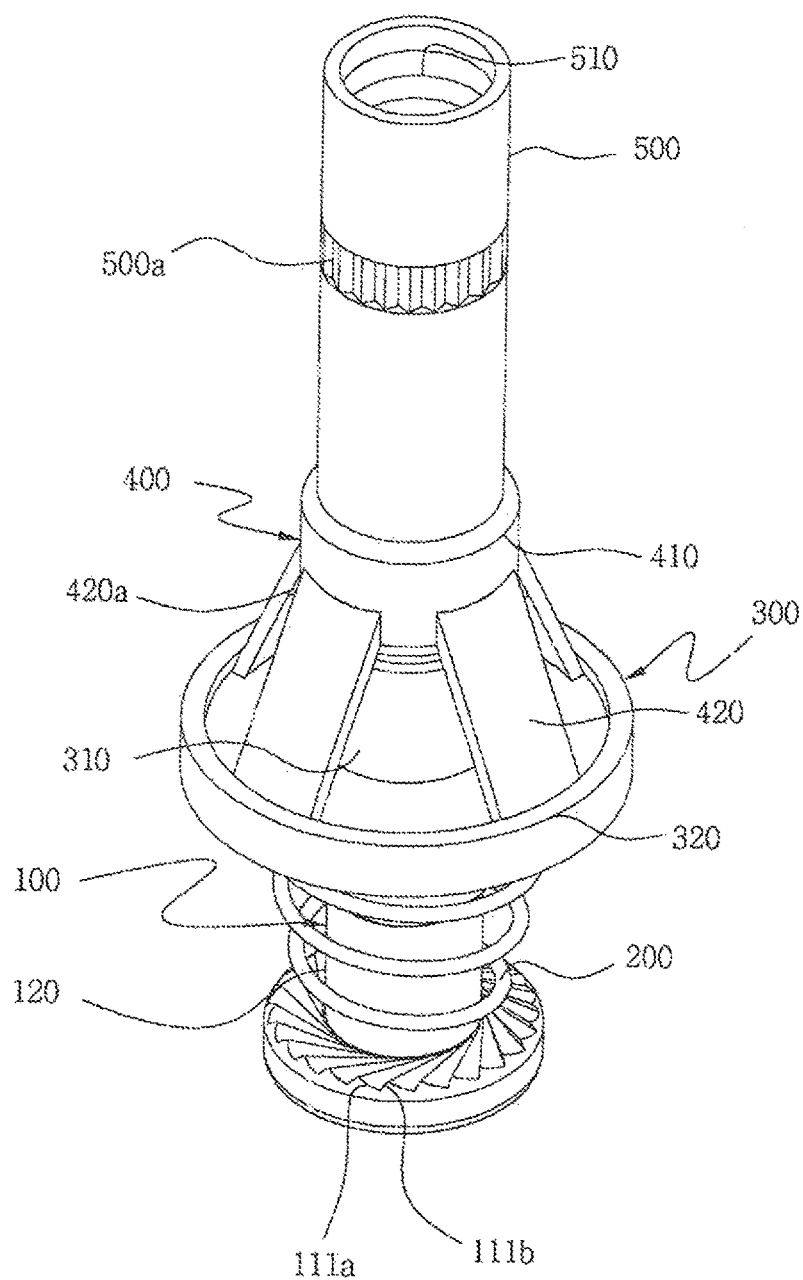
FIG. 4 is a view showing an entire configuration of an insert bolt according to the present invention.

FIG. 4 is a view showing an entire configuration of an insert bolt according to the present invention.

Figure 5:
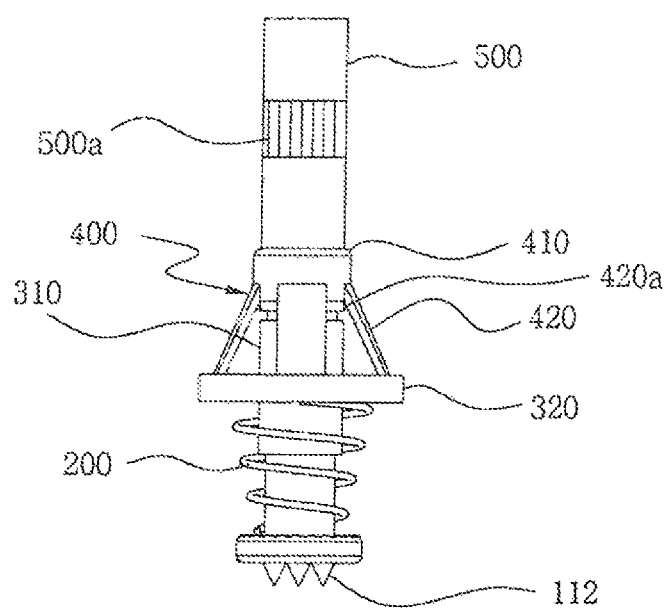
FIG. 5 is a front view showing the insert bolt according to the present invention.

FIG. 5 is a front view showing the insert bolt according to the present invention.

Figure 6:
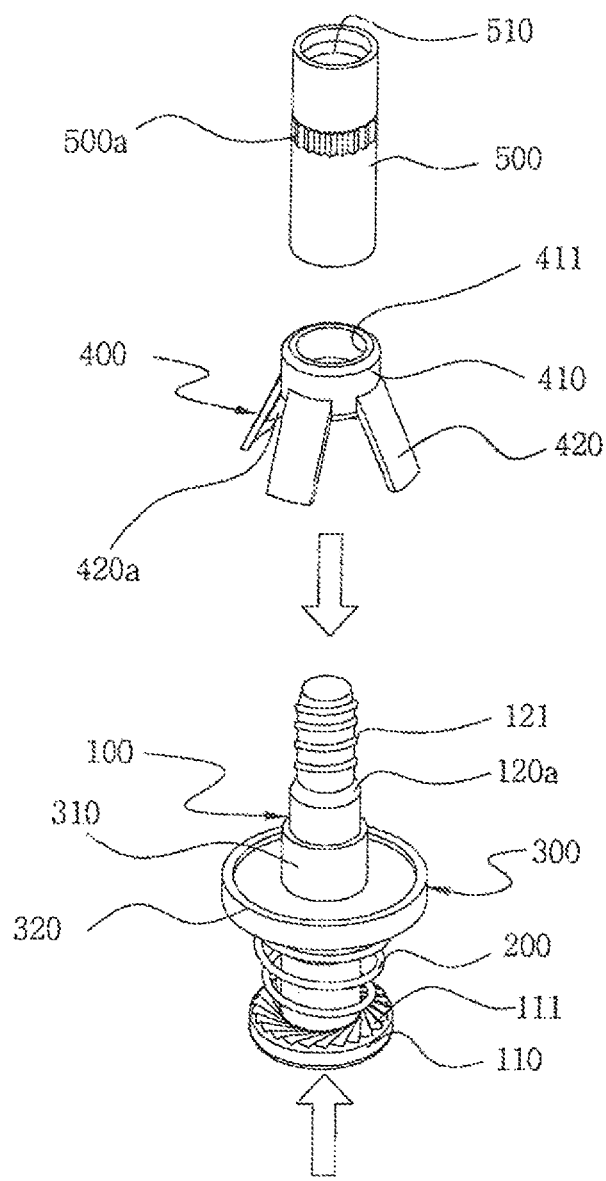
FIG. 6 is an exploded perspective view showing the insert bolt of the present invention.

FIG. 6 is an exploded perspective view showing the insert bolt of the present invention.

Figure 7:
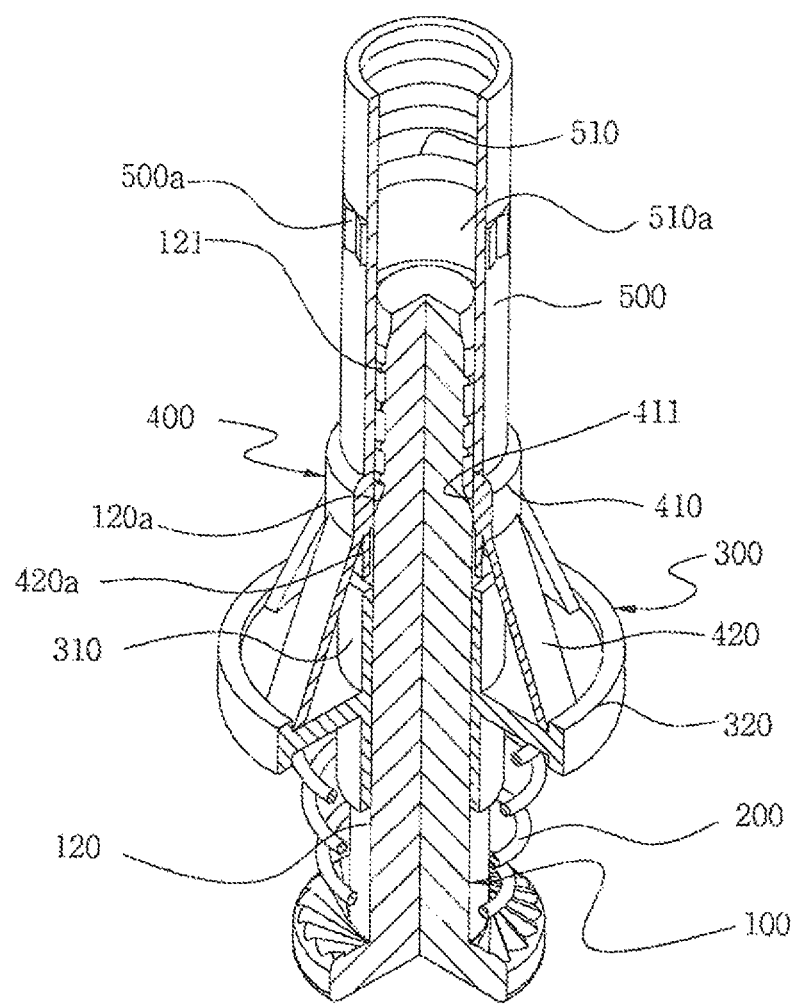
FIG. 7 is a partially cut-off perspective view showing the insert bolt of the present invention.

FIG. 7 is a partially cut-off perspective view showing the insert bolt of the present invention.

Figure 8:
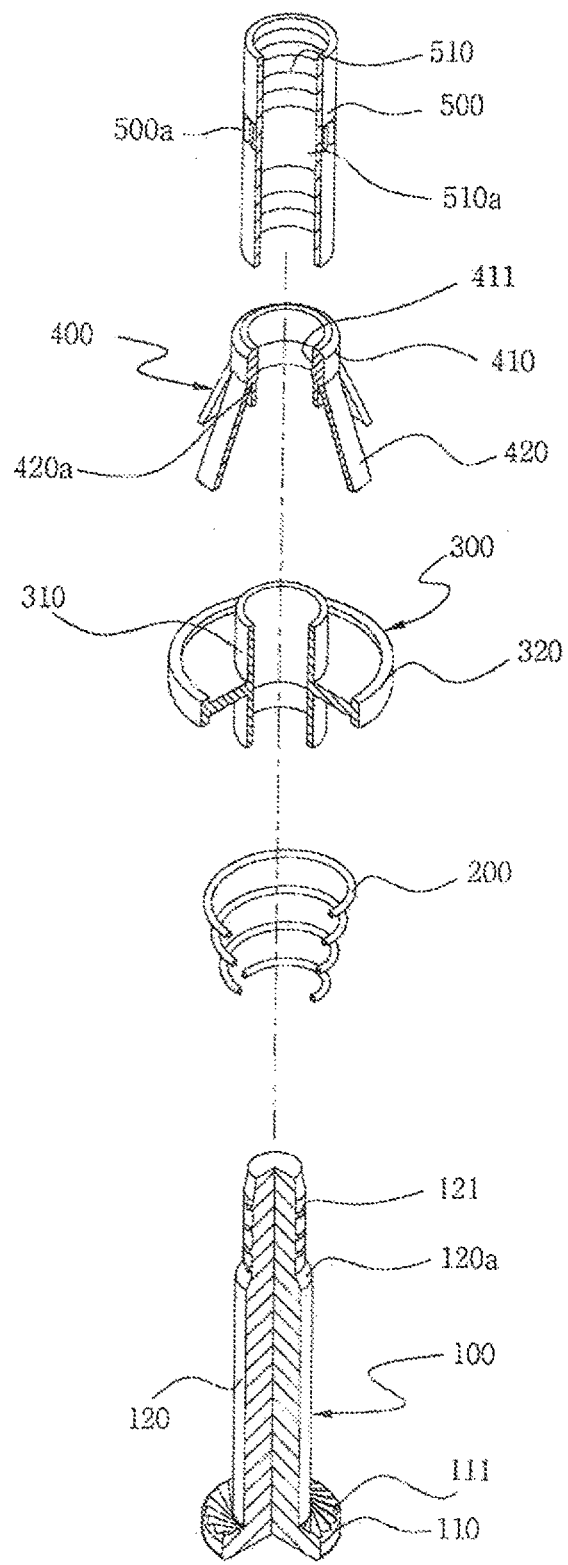
FIG. 8 is an exploded cut-off perspective view showing the insert bolt of the present invention.

FIG. 8 is an exploded cut-off perspective view showing the insert bolt of the present invention.

Figure 9:
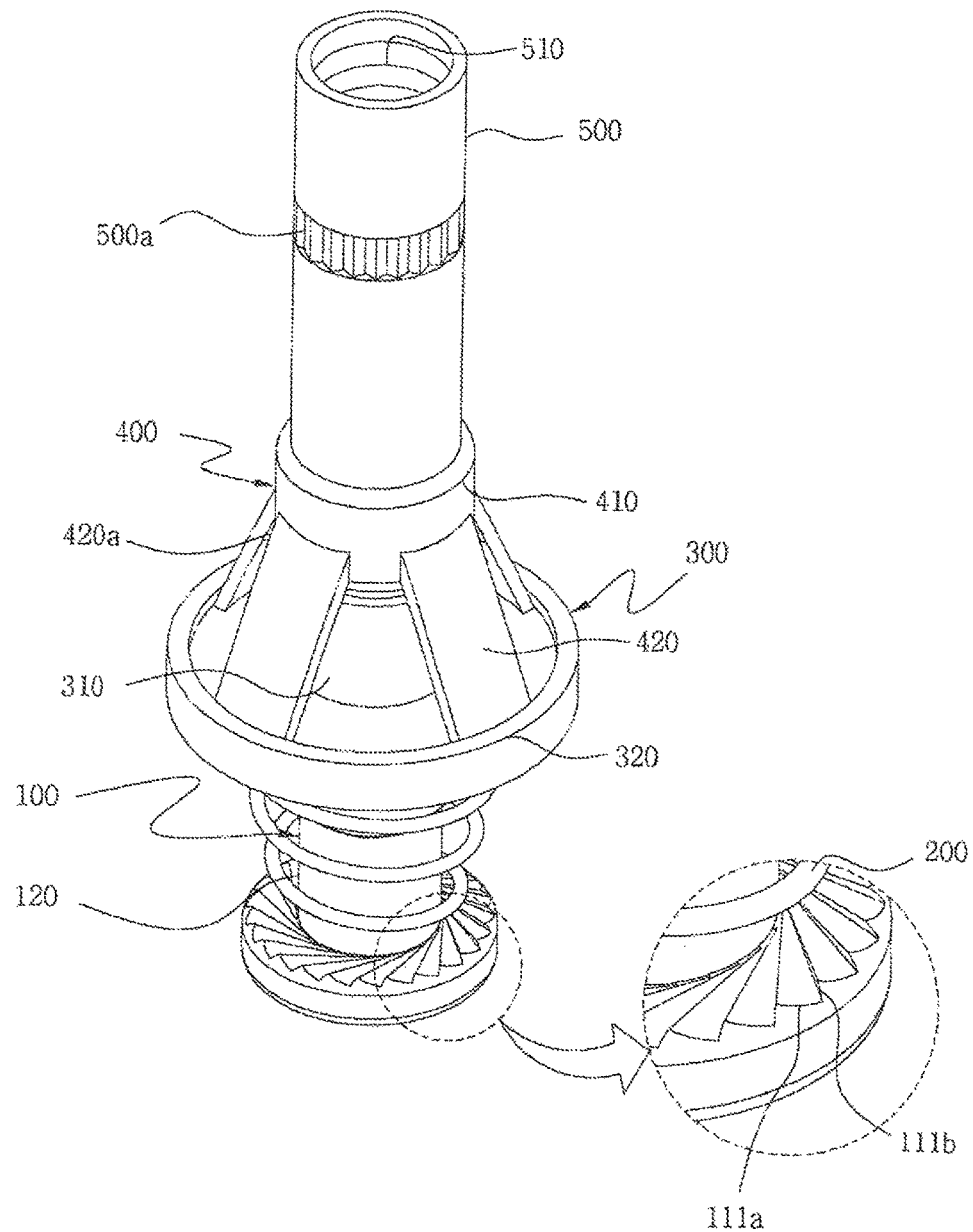
FIG. 9 is an enlarged view showing a main part of the present invention.

FIG. 9 is an enlarged view showing a main part of the present invention.

Figure 10:
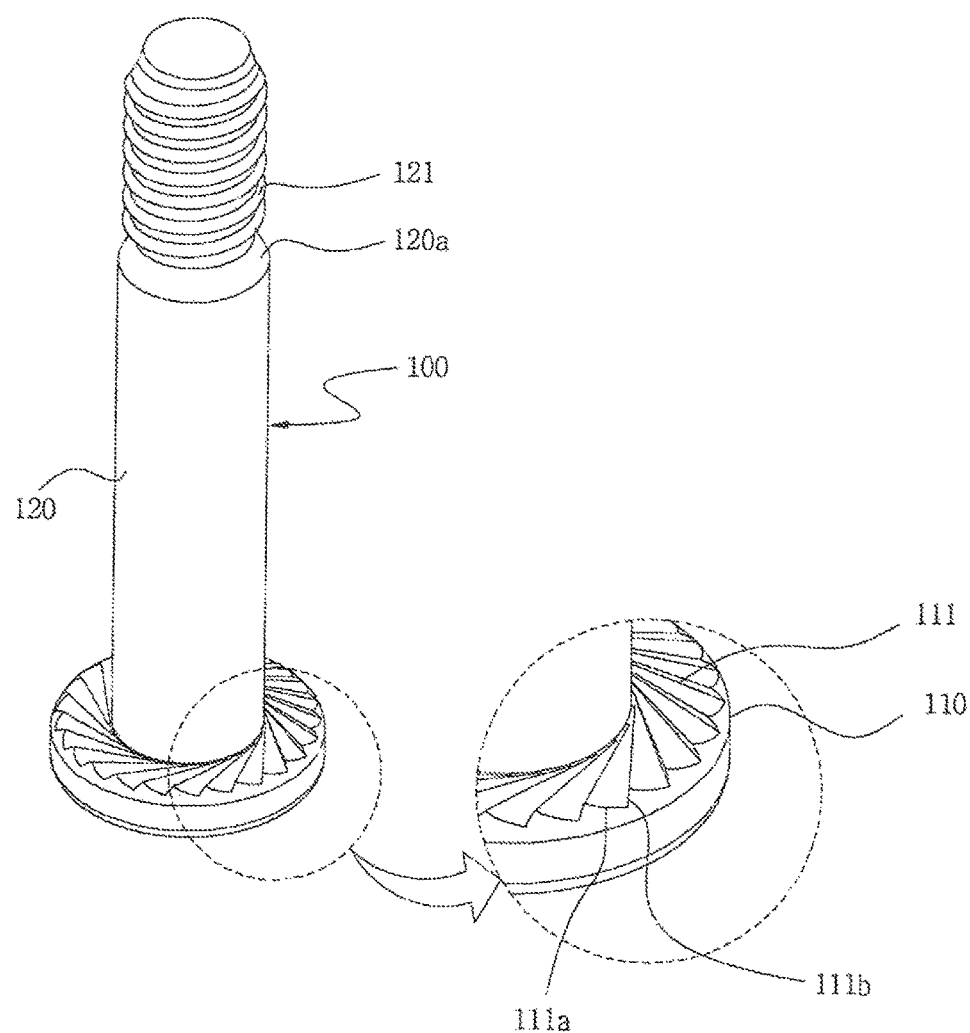
FIG. 10 is an enlarged view showing a head part of the insert bolt of the present invention.

FIG. 10 is art enlarged view showing a head part of the insert bolt of the present invention.

Figure 11:
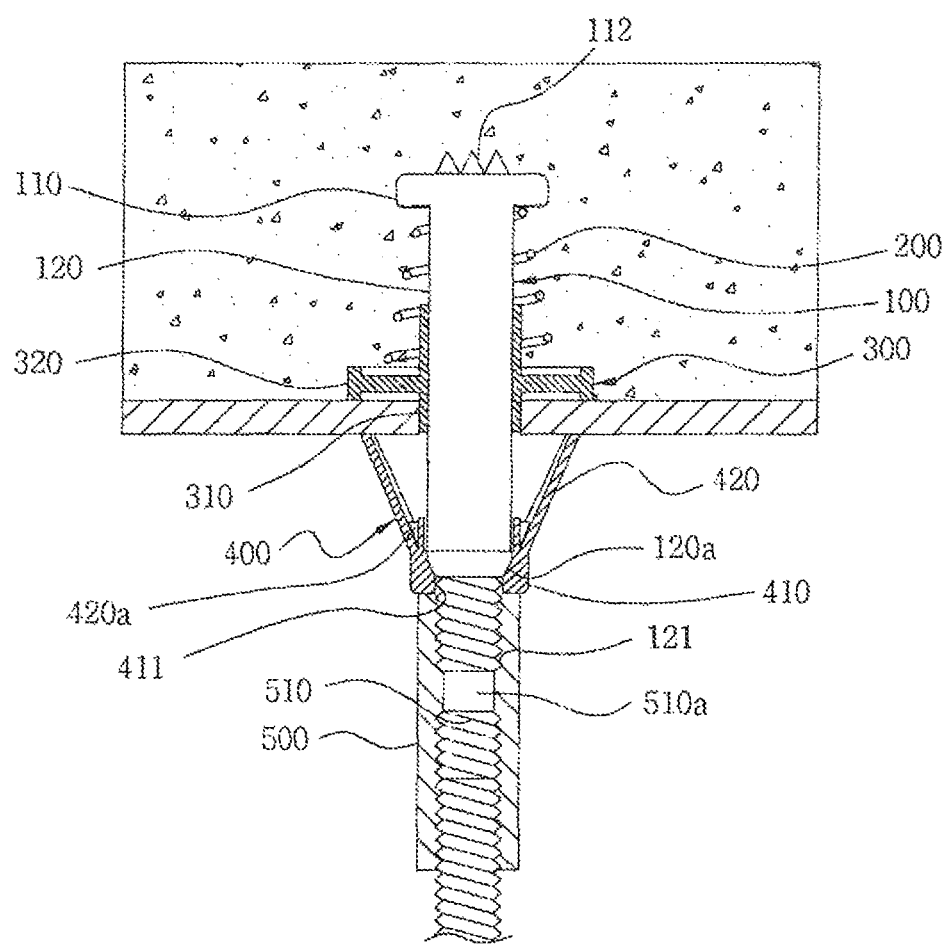
FIG. 11 is a view showing an example of an installation of the present invention.

FIG. 11 is a view showing an example of an installation of the present invention.

The insert bolt of the present invention includes a bolt shaft 100, a spring 200, a sliding movement member 300, a supporting rib member 400 and a connecting rod 500, wherein one-way teeth are formed on one side of the bolt shaft 500.

The bolt shaft 100 of the present invention includes a disc-shaped head part 110, a central shaft 120 in a form of a circular cylinder integrally formed in a center part of the disc-shaped head part, the disc-shaped head part has one-way teeth 11, and a lower part of the central shaft 120 has a screw thread 121.

The one-way teeth 111 include an inclined surface 111a and a vertical surface 111b, such that, when an external force is applied to the inclined surface 111a, the force is dispersed through the inclined surface 111a, and when the external force is applied to the vertical surface 111b, the force is directly transferred to the vertical surface 111b to generate a strong rotational force.

In addition, a concavo-convex 112 may be further formed on an upper pert of the disc-shaped head part 110, such that the insert bolt does not move and is easily coupled when casting concrete. In other words, to increase the coupling force of the concrete with the bolt shaft 100 during the casting of the concrete, the concavo-convex 112 is further formed on the upper part of the disc-shaped head part 110.

The spring 200 is inserted into the bolt shaft 100 to perform an elastic function.

The sliding movement member 300 includes a cylindrical body 310 slidably coupled to the bolt shaft and a disc 320 integrated to an outer side of the cylindrical body, wherein the cylindrical body 310 is fitted to an outer side of the bolt shaft 100 and is coupled to a lower part of the spring 200, and the disc 320 supports the spring 200 such that the outer body of the bolt shaft is fluctuated by the spring force.

The supporting rib member 400 includes a cylindrical fixing part 410 and an inclined panel 420 slantly installed at an outer side of the cylindrical fixing part, wherein the supporting rib member 400 is coupled to an outer side of the bold shaft 100 and is coupled to a lower part of the disc constituting the supporting rod 300. In addition, a latching protrusion 411 is formed on the cylindrical fixing part 410 of the supporting rib member 400 and fixed in the inclined protrusion 120a between the central shaft 120 and the screw thread 121 of the bolt shaft 100, thus, the cylindrical fixing part 410 is supported by the connecting rod 500, which will be described, and made immovable and only the inclined panel 410 moves inward and outward. In addition, a reinforcement member 420a is formed between the inclined panel 420 and the cylindrical fixing part 410, so that, when the reinforcement member 420a is formed, the inclined panel 420 is blocked from bending outward, thereby enabling the inclined panel 420 to stably perform its role.

The connecting rod 500 has a cylindrical shape and includes a screw thread forming section 510 inside thereof, wherein the screw part of the end part of the bolt shaft 100 is screwed to the connecting rod 500 and the supporting rib member makes close contact and is fixed to a lower end of the central shaft of the bolt shaft.

The connecting rod 500 includes a concavo-convex 500a formed at an outer side thereof, so that the connecting rod 500 is more securely coupled to the concrete when casting the concrete.

In addition, the connecting rod 500 includes a screw thread non-forming section 510 at an inner central part thereof to limit the coupling length of the bolt shaft 100. In other words, if the screw thread non-forming section is not formed as described above, the coupling depth of the bolt may not be limited, so the bolt shaft 100 and the connecting rod 500 are only slightly coupled or coupled too deeply such that, when another coupling unit is coupled through the lower part of the connecting rod 500, the coupling depth may not be determined, thus easily coupling the other coupling unit is difficult. However, in the present invention, because the coupling length of the bolt and the connecting rod 500 is determined and the bolt shaft 100 needs to be coupled up to the screw thread non-forming section 510a, the connection rod 500 and the bolt shaft 100 are easily coupled.

Hereinafter, the assembly method of the present invention will be described.

Main components of the present invention include the bolt shaft 100, the spring 200, the sliding movement member 300, the supporting rib member 400 and the connecting rod 500.

In the present invention, the bolt shaft 100 is coupled to the spring 200, the supporting rod 300 is coupled to the central shaft 120 constituting the bolt shaft 100, and the sliding movement member 300 is disposed at the lower part of the spring 200.

In addition, the supporting rib member 400 is coupled to the lower part of the sliding movement member 300, the cylindrical firing member 410 of the supporting rib member 400 is inserted and fixed between the central shaft 110 of the bolt shaft 100 and the connecting rod 500, and the inclined panel 420 makes close contact with the disc 320 of the sliding movement member 300.

In addition, the screw thread 121 of the bolt shaft 100 is coupled to the screw thread forming section 510 formed at the inner side of the connecting rod 500, such that the bolt rod 100 is coupled to the lower end of the cylindrical fixing part 410, thereby completing the entire coupling of the present invention.

Hereinafter, the operational effect of the present invention will be described.

For the insert bolt of the present invention, a hole, into which the insert bolt is to be inserted, is drilled through a structure such as a steel beam, and then the insert bolt is inserted into the hole.

When the insert bolt is inserted into the hole, and the supporting rib member 400 makes contact with an entrance of the hole after continuously progressing inward, the inclined panel 420 is contracted and pushed inward into the inner part of the hole, and the disc 320 of the sliding movement member 300 is disposed at the upper part of the structure such as the steel beam while pushing the spring 200 upward.

In this case, the cylindrical fixing part 410 of the supporting rib member 400 inserted, coupled and fixed to the inclined protrusion 120a between the central shaft 120 of the bolt shaft 100 and the connecting rod 500, the inclined panel 420 does not move up and down and only moves inward.

In addition, when the insert bole is continuously progressed inward, the insert bolt is completely inserted into the lower part of the structure such as the steel beam such that the inclined panel 420 is spread again, and the disc 320 of the sliding movement member 300 makes close contact and is supported on the upper part of the structure such as the steel beam.

In this case, in the present invention, because the reinforcement member 420a is added between the inclined panel 420 and the cylindrical fixing part 410, the inclined panel maintains a spread state at a predetermined angle such that the inclined panel does not bend further.

In addition, when the reinforcement member 420a is not provided, the inclined panel 420 becomes further bent when the pressure is concentrated such that the inclined panel 420 may not perform the supporting role. However, in the present invention, because the reinforcement member 420a is added, the inclined panel 420 is more strongly supported, so that the inclined panel 420 may appropriately perform its role.

When the installation of the insert bolt is completed, the concrete is casted, so that she insert bolt is securely fixed to a ceiling or a wall surface.

In this case, when casting the concrete, the bolt shaft 100 only moves in a tightening direction by the one-way teeth 111 of the bolt shaft 100, thus, the coupling state of the bolt shaft 100, supporting rib member 400 and the connecting rod 500 is securely maintained.

In other words, when casting the concrete, the pressure is applied to the bolt shaft 100 along the casting direction of the concrete. Accordingly, because the one-way teeth 111 are formed at the lower side of the disc-shaped head part 100 constituting the bolt shaft 100, the bolt shaft 100 screwed to the connecting rod 500 is moved in the tightening direction, thus the bolt shaft 100 and the connecting rod 500 securely maintains the coupling state. In addition, because the bolt shaft 100 and the connecting rod 500 are securely coupled, the supporting rib member 400 coupled between the bolt shaft 100 and the connecting rod 500 does not move and maintains the solid coupling state.

When the one-way teeth 111 of the present invention are not formed, the bolt shaft 100 may move in a loosening direction by the concrete casting pressure, and, in this case, the bolt shaft 100 becomes loose from the connecting rod 500, so the supporting rib member 400 is not fixed, thus the insert bolt is not entirely securely fixed.

Therefore, in the present invention, by the one-way teeth 11, the bolt shaft 100 is moved in the tightening direction regardless of the concrete casting pressure such that the bolt shaft 100 is not released from the connecting rod. Accordingly, the supporting rib member 400 coupled between the bolt shaft 100 and the connecting rod 500 is securely coupled, so the insert bolt is not transversely or longitudinally moved, thus the insert bolt may be securely coupled to the structure such as the steel beam.

In addition, the concavo-convex 112 is added on the upper part of the disc-shaped head part 110 of the bolt shaft 100, so the concrete makes contact with the concavo-convex 112 when casting concrete, thus the coupling force between the concrete and the bolt shaft 100 may be maximized.

What is claimed is:

1. An insert bolt having an anti-turn function, the insert bolt comprising:
   a bolt shaft (100);
   a spring (200) coupled to an outer side of the bolt shaft to perform an elastic function;
   a sliding movement member (300) coupled to the outer side of the bolt shaft and coupled to a lower part of the spring to perform a sliding movement;
   a supporting rib member (400) positioned in a lower part of the sliding movement member and supporting the sliding movement member; and
   a connecting rod (500) connected to a lower part of the bolt shaft,
   wherein the bolt shaft (100) includes:
   a disc-shaped head part (110); and
   a central shaft (120) in a form of a circular cylinder integrally formed in a center part of the disc-shaped head part (110),
   wherein the disc-shaped head part has one-way teeth (111), a lower part of the central shaft (120) has a screw thread (121), and the one-way teeth (111) includes an inclined surface (111*a*) and a vertical surface (111*b*), such that, when an external pressure is applied due to concrete casting, the concrete casting pressure is dispersed through the inclined surface (111*a*) and the concrete casting pressure is aggregated through the vertical surface (111*b*) such that a rotating force is created only in a direction in which the bolt shaft tightens onto the connecting rod;
   the connecting rod (500) includes a screw thread forming section (510) and a screw non-forming section (510*a*) at an inner part thereof;
   the bolt shaft (100) further includes a concavo-convex (112) on an upper part of the disc-shaped head part (110) to increase a coupling force of concrete, and the connecting rod (500) further includes a concavo-convex (500*a*) at an outer side of the connecting rod (500) to increase the coupling force of the concrete; and
   the supporting rib member (400) includes a cylindrical fixing part (410) and a inclined panel (420) slantly installed at an outer side of the cylinder fixing part, and
   wherein the cylindrical fixing part (410) includes a latching protrusion (411) fixed between an inclined protrusion (120*a*) of the bolt shaft (100) and the connecting rod (200) to block a movement of the cylindrical fixing part along an outer side of the bolt shaft, and the inclined panel (420) includes a reinforcement member (420*a*) provided between the cylindrical fixing member (410) and the inclined panel to prevent the inclined panel from bending.

\* \* \* \* \*